(No Model.)
J. J. BERRIGAN.
CREAM SEPARATOR.
No. 501,039. Patented July 4, 1893.
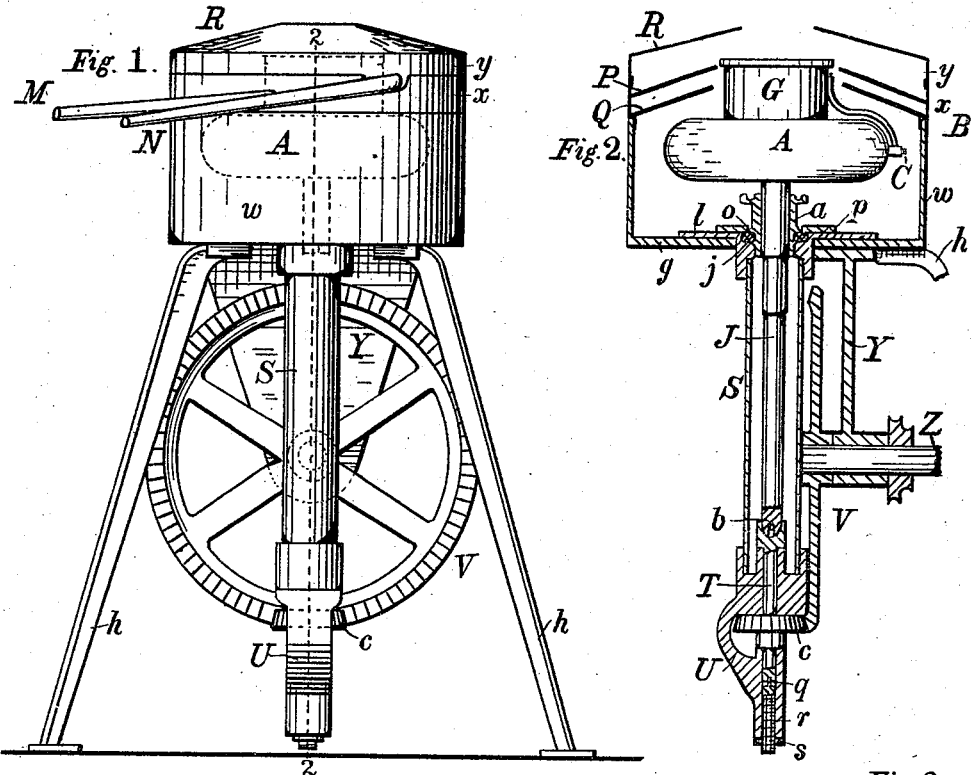
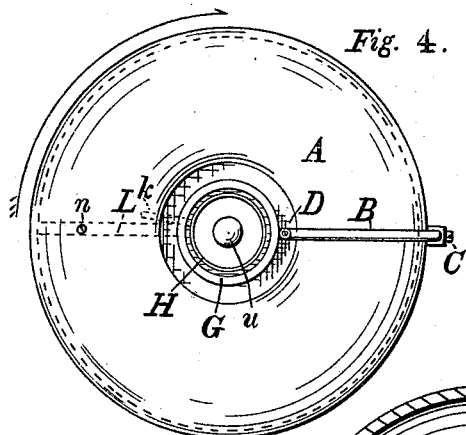
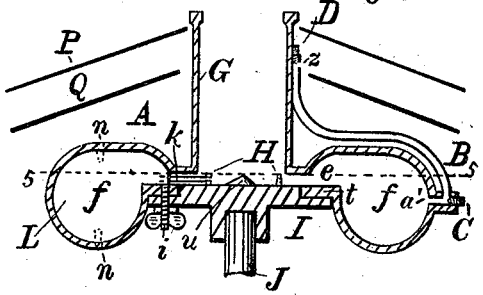
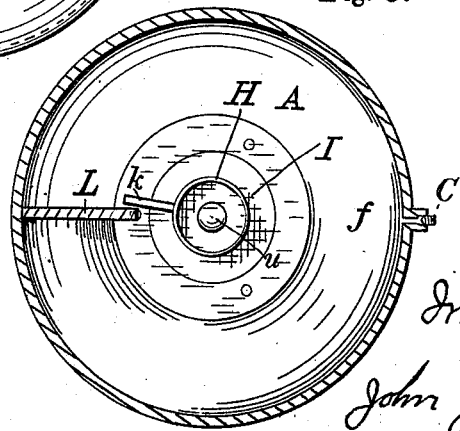
Witnesses:
C. B. Hatfield
Geo. B. Selden.
Inventor:
John J. Berrigan.

UNITED STATES PATENT OFFICE.

JOHN J. BERRIGAN, OF AVON, NEW YORK.

CREAM-SEPARATOR.

SPECIFICATION forming part of Letters Patent No. 501,039, dated July 4, 1893.

Application filed August 25, 1892. Serial No. 444,047. (No model.)

*To all whom it may concern:*

Be it known that I, JOHN J. BERRIGAN, a citizen of the United States, residing at Avon, in the county of Livingston, in the State of New York, have invented certain Improvements in Cream-Separators, of which the following is a specification, reference being had to the accompanying drawings.

My invention relates to certain improvements in centrifugal cream-separators, which improvements are fully described and illustrated in the following specification and the accompanying drawings,—the novel features thereof being specified in the claims annexed to the said specification.

In the accompanying drawings representing my invention,—Figure 1 is a side elevation. Fig. 2 is a central vertical section on the line 2—2, Fig. 1. Fig. 3 is a central vertical section of the revolving bowl. Fig. 4 is a plan view of the bowl. Fig. 5 is a horizontal section of the bowl on the line 5—5, Fig. 3, showing the parts below said line.

A represents the bowl of my improved cream-separator, which is supported on an upright shaft J, arranged to revolve in suitable bearings, and provided with suitable mechanism for driving it. In the construction shown, the shaft J, revolves in a bearing $a$ immediately below the bowl,—its lower end being connected by a joint $b$ with the shaft T, which is driven from the gear V by the pinion $c$. The bearing $a$ is supported by the plate $g$, provided with a suitable frame work or legs $h$. An elastic ring or washer $j$ is interposed between the bearing $a$ and the plate $g$ or an intermediate plate or disk $l$, so as to permit a slight amount of yielding motion in the bearing. The bearing $a$ is provided with an annular flange $o$ which bears upon the ring $j$, which is compressed by the plate $p$ secured to the plate $l$ or $g$ in any suitable manner. A groove may be formed around the bearing for the reception of the ring $j$. The gear V is supported on a shaft Z arranged to revolve in a suitable journal on the arm Y attached to the plate $g$. The shaft Z may be provided with pulleys or gears or any other suitable means of operating the machine. The gear V meshes with the pinion $c$ on the shaft T, which revolves in suitable journals in the bracket U,—its lower end running on a point $q$ on a screw $r$ adjustable in the bracket and secured in place by the nut $s$.

The construction of the bowl A will be understood from an examination of Fig. 3. It is provided with an outer annular space or channel $f$ and an inner narrow or contracted throat $e$, and the upwardly projecting collar or neck G. The annular space is approximately circular in cross section,—its upper portion however extending inward to connect with the throat $e$. The bottom of the bowl inside the annular space is formed by the circular plate or disk I fitted accurately to the bowl and secured by the screws $i$ or other suitable devices to the inwardly projecting flange or rim $t$. The shaft J is inserted in a boss on the lower side of the plate I. On top of the plate I is located the cup H which may be made removable or formed in one piece with the plate. From the cup H a tube $k$ projects radially outward, its outer end being placed a short distance outside the inner edge of the wing or fan L, which extends radially across the annular space $f$, being secured in place by pins or screws $n$ inserted into it from the outside of the bowl. By removing the bottom I access may be had to the interior of the bowl for the purpose of cleaning it. When the bottom is removed, a suitably shaped scraper may be introduced into the bowl to clean it. A small cone $u$ is placed at the center of the cup or disk. As the speed at which the bowl in my improved cream-separator is required to run is comparatively low, it may be made of cast metal and turned true inside and out. From the plate $g$ a circular flange $w$ projects upward and supports the sheet metal rings $x$ and $y$ which carry the inclined covers P and Q, the discharge pipes M and N, and also an additional cover R. These parts are conveniently made of sheet metal.

In the operation of the machine the milk is fed in a graduated stream into the neck G, and the cream escapes through the outlet pipe N while the skim milk is discharged through the pipe M. The skim milk is discharged from the bowl through an orifice $z$ in the pipe B, which is connected with the outer side of the bowl, and extends upward and inward along the side of the neck G. The milk finds its way into the tube G from an orifice $a'$, Fig. 3, the size of which is regulated by a suitable valve such as the screw plug C, the inner end of which projects more or less into the orifice so as to vary the size of the opening into the tube B. An additional valve or screw plug D is provided at the upper end of the tube B, which is also used for the purpose of regulating the rate at which the skim milk is discharged from the bowl. From the opening $z$ the skim milk is discharged onto the cover Q from which it finds its way down to the spout M. The cream escapes over the top of the neck G onto the cover P from which it enters the spout M. When the bowl revolves in the direction indicated by the arrow in Fig. 4, the pipe $k$ is arranged just in front of the wing or fan L; it should be placed on the other side of the wing if it be desired to run the bowl in the opposite direction.

I claim—

1. In a centrifugal cream-separator, the combination with the revolving bowl A, provided with the upwardly extending neck G, of the exterior milk pipe B, attached to the outside of the bowl and extending upward and inward over the top of the bowl, and thence upward along the neck, and provided with means for regulating the discharge of milk therethrough, substantially as described.

2. In a centrifugal cream-separator, the combination with the revolving bowl A, provided with the upwardly extending neck G, of the exterior milk pipe B, attached to the outside of the bowl and extending upward and inward over the top of the bowl, and thence upward along the neck, and provided with a discharge-regulating valve at or near the point where the pipe is connected with the outside of the bowl, substantially as described.

3. In a centrifugal cream-separator, the combination with the revolving bowl A, provided with the upwardly extending neck G, of the exterior milk pipe B, attached to the outside of the bowl and extending upward and inward over the top of the bowl, and provided with a discharge regulating valve at or near the point where the pipe is connected with the outside of the bowl, and with another discharge regulating valve at or near the delivery end of the tube, substantially as described.

4. In a centrifugal cream-separator, the combination with the revolving bowl A, provided with the upwardly extending neck G, and having its bottom closed by the removable plate I, of the exterior milk-pipe B, attached to the outside of the bowl and extending upward and inward over the top of the bowl, and thence upward along the neck, and provided with means for regulating the discharge of milk therethrough, substantially as described.

5. In a centrifugal cream-separator, the combination of the bowl A, arranged to revolve on a vertical axis, and having the outer enlarged annular space $f$, inner contracted throat $e$, and upwardly extending open-ended neck G, the wing L extending across the space $f$, and a suitable milk-discharge pipe, substantially as described.

6. In a centrifugal cream-separator, the combination of the bowl A, arranged to revolve on a vertical axis, and having its bottom closed by the removable plate I, and having the outer enlarged annular space $f$, inner contracted throat $e$ and upwardly extending open ended neck G, the wing L, extending across the space $f$, and a suitable milk-discharge pipe, substantially as described.

7. In a cream-separator, the combination of the revolving bowl A, arranged to revolve on a vertical axis, and having the outer annular space $f$, inner contracted throat $e$, wing L, exterior milk-pipe B, and covers P and Q, for milk and cream respectively, substantially as described.

8. In a cream-separator, the combination with the revolving bowl A, arranged to revolve on a vertical axis, and having the outer annular space $f$, inner contracted throat $e$, open neck G, cup H, having radial pipe $k$, and the wing L, of the exterior pipe B, attached to the outside of the bowl and extending upward and inward over the top of the bowl, and thence upward along the neck and provided with means for regulating the discharge of milk therethrough, substantially as described.

JOHN J. BERRIGAN.

Witnesses:
GEO. B. SELDEN,
C. G. CRANNELL.